United States Patent [19]

Masuzawa et al.

[11] Patent Number: 4,826,580
[45] Date of Patent: May 2, 1989

[54] METHOD AND APPARATUS FOR FINISHING CUT SURFACE OF WORK PRODUCED BY WIRE CUT DISCHARGE PROCESS

[75] Inventors: Takahisa Masuzawa, Kamakura; Shigenori Sakai, Tokyo, both of Japan

[73] Assignee: Research Development Corporation of Japan, Tokyo, Japan

[21] Appl. No.: 13,811

[22] Filed: Feb. 12, 1987

[30] Foreign Application Priority Data

Feb. 13, 1986 [JP] Japan .................................. 61-27783

[51] Int. Cl.$^4$ .......................... B23H 1/10; B23H 3/10; B23H 7/02; B23H 9/12
[52] U.S. Cl. ........................ 204/129.43; 204/129.5; 204/129.7; 204/DIG. 9; 204/129.75; 204/224 M; 204/275; 219/69.17; 219/69.12
[58] Field of Search ............ 204/129.43, 129.5, 129.7, 204/129.75, 224 M, 204, 297 R, 206, 275; 219/69 M, 69 W

[56] References Cited

U.S. PATENT DOCUMENTS

| | | | |
|---|---|---|---|
| 2,924,701 | 2/1960 | Stamper | 219/69 M |
| 2,927,190 | 3/1960 | Dulebohn et al. | 219/69 M |
| 3,154,664 | 10/1964 | Zeder, Jr. | 219/69 M |
| 3,326,785 | 6/1967 | Williams | 204/140.5 |
| 3,658,684 | 4/1972 | Sickels | 204/297 R X |
| 3,689,387 | 9/1972 | Jumer | 204/140.5 |
| 4,083,767 | 4/1978 | Suslin et al. | 204/224 M X |
| 4,487,671 | 12/1984 | McGeough | 204/224 M X |
| 4,547,646 | 10/1985 | Brifford | 204/297 R |
| 4,609,803 | 9/1986 | Inoue | 204/206 X |
| 4,628,172 | 12/1986 | Inoue | 204/224 M X |
| 4,661,678 | 4/1987 | Waure | 204/206 X |
| 4,673,787 | 6/1987 | Inoue | 219/69 M X |

OTHER PUBLICATIONS

Transactions of the Institute of Metal Finishing, vol. 62, part 2, Aug. 1985, Birmingham, GB; L.E.A. Berlouis et al.
Journal of the Electrochemical Society, vol. 122, No. 11, Nov. 1975, pp. 1466–1472, The Eletrochemical Society.

Primary Examiner—Donald R. Valentine
Attorney, Agent, or Firm—Armstrong, Nikaido, Marmelstein & Kubovcik

[57] ABSTRACT

A method and a device for finishing the cut surface of a work which is cut from a metal blank by a wire cut discharge process. The work and the waste piece of the metal blank are positioned in the same condition as just after the process. Electrolyte is fed through a clearance between the work and the waste piece and, at the same time, current is caused to flow from the work to the remainder. This subjects the cut surface of the work to electrolytic treatment to thereby make it smooth while removing oxide films and degenerated surface layers therefrom.

8 Claims, 5 Drawing Sheets

METHOD AND APPARATUS FOR FINISHING CUT SURFACE OF WORK PRODUCED BY WIRE CUT DISCHARGE PROCESS

BACKGROUND OF THE INVENTION

The present invention relates to a method and an apparatus for finishing a cut surface of a metal work and, more particularly, to a method of finishing smooth a cut surface of a work which was cut from a metal blank by a wire cut discharge process.

Gears and other flat metal works have complicated configurations and require accurate machining are often fabricated by a wire cut discharge process. As well known in the arc, a wire cut discharge process is such that arc discharge is caused between a metal blank and a wire electrode, which is fed from one of two reels to the other, while the metal blank is moved under numerical control in a plane which is perpendicular to the feed direction of the wire, thereby cutting the blank in a desired shape. The recent progress in the numerical control art has made it possible to fabricate products having significantly complicated configurations.

Even with a wire cut discharge process, however, a difficulty has been experienced in finishing a cut surface of a work to a mirror surface. Specifically, although such a process includes second cutting which follows first cutting and is implemented with the discharge of short pulses, this kind of finishing technique leaves undesirable oxide films and degenerated layers on the finished surface due to the discharge. Generally, such oxide films and degenerated layers must be removed because they are detrimental to the physical property of a metal blank.

Therefore, when it is desired to finish a cut surface of a work produced by the above process smooth, the cut surface is usually ground by a grinder of the kind using diamond and other particles or a lapping machine. However, such a prior art finishing method has various drawbacks. When it comes to gears and other components the cut surfaces of which are complicated in configuration, the cut surfaces have to be finished one by one by hand. Because the oxide films formed on the cut surface due to discharge constitute hard surface layers, the manual finishing work not only consumes a prohibitive period of time but also requires expertness.

In light of the above, there has been proposed a finishing method which uses a special electrode the configuration of which is complementary to a cut surface of a work, as disclosed in Japanese Patent Publication No. 54-16079. Specifically, in accordance with such a method, a special electrode having an electrode surface which is complementary to a particular cut surface of a work is positioned to face the latter at a substantially uniform distance. While an electrolyte is fed through a clearance defined between the work and the electrode, current is caused to flow between the work and the electrode via the electrolyte so as to finish the cut surface by electrolytic polishing.

The special electrode scheme as stated above may successfully finish the cut surface smooth by removing oxide films and degenerated layers which are entailed by discharge. However, the use of a special electrode results in the need for extra manufacturing steps. When a gear or like work whose cut surface is complicated in shape is to be finished, the electrode surface of the electrode, too, has to be provided with a complicated shape at the sacrifice of cost. Moreover, various kinds of works which are different in configuration cannot be finished unless electrodes each matching with a particular configuration are prepared. In addition, the finishing work consumes a substantial period of time so long as it depends on such electrolytic polishing.

SUMMARY OF THE INVENTION

It is therefore an object of the present invention to provide a method capable of finishing rapidly and easily a cut surface of a metal work which is produced by a wire cut discharge process.

It is another object of the present invention to prevent oxide films and degenerated layers from being formed on a finished surface of a work.

It is another object of the present invention to allow a cut surface of a work to be finished by electrolytic treatment and, yet, eleminates the need for a special electrode.

It is another object of the present invention to provide a simple device for finishing a cut surface of a work.

In order to achieve the above objects, in accordance with the present invention, a cut surface of a work which was cut from a metal blank in a desired shape by a wire cut discharge process is finished by electrolysis using the remaining portion, or waste, of the blank as an electrode. Specifically, the work and the waste are positioned in the same condition as just after the wire cut discharge process and, therefore, with a clearance left therebetween which is the sum of the diameter of a wire electrode used and a discharging gap. While an electrolyte is fed through the clearance, current is caused to flow from the work to the waste via the electrolyte. This causes the metal on the cut surface of the work to dissolve as metal ions with the result that the surface layer of the cut surface is removed. The finished surface, therefore, is free from degenerated layers, hair cracks and so on. In addition, because projections on the cut surface are easier to melt than the other portions, the finished surface achieves a significant degree of smoothness.

During the finishing process, a relatively high current density is applied to promote rapid dissolution and, thereby, complete the finishing process within a short period of time.

Due to the use of the waste of a metal blank as an electrode, the electrode surface of the electrode is accurately complementary in shape to the cut surface of the work, eliminating the need for a special electrode. This, coupled with the use of the waste which has heretofore been discarded, renders the finishing operation cost-effective.

A device for practicing the method of the present invention as stated above includes a housing which defines a passageway for the circulation of an electrolyte under pressure, and fixing members capable of fixing a work cut from a metal blank by a wire cut discharge process and a waste of the metal blank such that a clearance between the work and the waste is positioned in the passageway. The work and the waste are electrically connected to a DC power source via the fixing members.

The device having the above construction allows the clearance between the work and the waste to be constantly filled with a fresh electrolyte. Further, because the electrical connection of the work and waste to the power source is accomplished merely by fixing them in place with the fixing members, the setting and replacing operations are easy to perform.

DESCRIPTION OF THE PREFERRED EMBODIMENT

Figure 1:
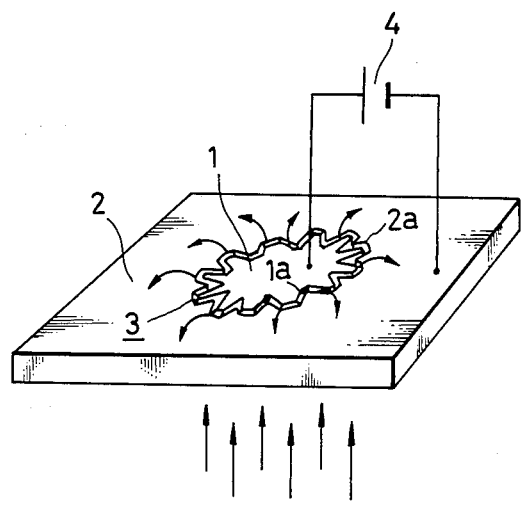
FIG. 1 is a perspective view representative of the principle of a finishing method in accordance with the present invention.

Referring to FIG. 1 of the drawings, the principle of the method in accordance with the present invention is shown. In FIG. 1, the reference numeral 1 designates a work cut from a metal blank by a wire cut discharge process and represented by a gear, and 2 designates an electrode constituted by the remaining portion of the metal blank. The outer periphery 1a of the gear 1 will hereinafter be referred to as a cut surface, and the inner periphery 2a of the electrode 2 as an electrode surface. The electrode surface 2a is complementary in shape to the cut surface 1a.

When the cut surface 1a of the gear is to be finished, the gear 1 and the electrode 2 are positioned to face each other with a substantially uniform clearance 3 defined therebetween, as shown in FIG. 1. So far as the gear 1 and the electrode 2 which are produced by a wire cut discharge process are concerned, the clearance 3 is the sum of the diameter of a wire used for the process and a discharging gap. In the above condition, an electrolyte such as an aqueous solution of sodium nitrate is fed under pressure upward from below the gear 1 and electrode 2. Then, the electrolyte flows upward through the clearance 3 between the gear 1 and the electrode 2, filling the clearance 3.

Then, the anode and the cathode of a DC power source 4 are connected to the gear 1 and the electrode 2, respectively. This allows current to flow from the gear 1 to the electrode 2 via the electrolyte which fills the clearance 3. Specifically, the metal which constitutes the cut surface 1a of the gear is dissolved as metal ions so that, if minute projections and recesses are present on the surface 1a, the metal of the projections are rapidly dissolved. As a result, the cut surface 1a of the gear 1 is smoothed.

During the course of the above process, metallic salts, bubbles and other produced by the electrolysis are entrained upward by the electrolyte which flows through the clearance 3. Hence, the clearance 3 is constantly filled with a fresh electrolyte which promotes desirable electrolysis. In addition, because the bubbles are moved upward, the upward flow of the electrolyte allows the material produced by electrolysis to be drained smoothly.

Figure 2:
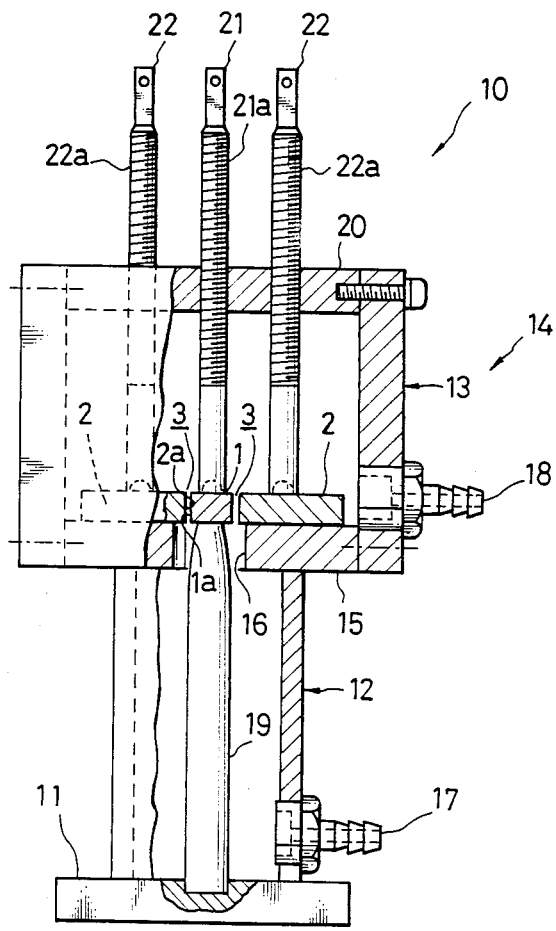
FIG. 2 is a vertical section showing a specific construction of a device for practicing the method of the present invention.

Referring to FIG. 2, a specific construction of a device for practicing the method of the present invention is shown and generally designated by the reference numeral 10. As shown, the device 10 includes a hollow rectangular post, or leg, 12 which stands upright on a base 11. The hollow post 12 constitutes a housing 14 of the device in combination with a generally box-like receptacle 13 which is mounted on the post 12. The receptacle 13 is constituted by plates which are made of an insulating material such as acryl, one side of the receptacle 13 being openable.

The interior of the post 12 is communicated to that of the receptacle 13 by an opening 16 which is formed through a central part of a bottom plate 15 of the receptacle 13. The post 12 is formed with a port 17 adjacent to the bottom thereof so that a conduit, not shown, may be connected to the port 17 for the supply and drain of an electrolyte. The receptacle 13 is also provided with a port 18 adjacent to the bottom thereof which is similar to the port 17. In this construction, a passageway for the flow of electrolyte is established through the post 12, opening 16 and receptacle 13.

A cylindrical support member 19 extends upward from the base 11 and has an upper end portion received in a central part of the opening 16 of the receptacle 13. The upper end of the support 19 is flush with the upper surface of the bottom plate 15 of the receptacle 13. The gear 1 is supported by the upper end of the support 19, and the electrode 2 by the upper surface of the bottom plate 15. The opening 16 is dimensioned such that when the gear 1 and electrode 2 are mounted as stated, the clearance 3 is positioned between the outer periphery of the support 19 and the wall of the opening 16.

A rod terminal 21 made of copper has a threaded portion 21a which is engaged in a central part of a top plate 20 of the receptacle 13. The rod terminal 21 is movable up and down when rotated. The lower end of the rod terminal 21 is located to face the upper end of the support 19. When the rod terminal 21 is driven into the receptacle 13, it fixes the gear 1 in place in cooperation with the support 19; the rod terminal 21 thus serving as a member for fixing the gear 1. Pressed against each other, the rod terminal 21 and the gear 1 are electrically connected to each other.

A plurality of rod terminals 22 which are similar to the terminal 21 are provided in a peripheral part of the top plate 20 of the receptacle 13. Specifically, each rod terminal 22 has a threaded portion 22a which is engaged in the top plate 20. The lower end of each rod terminal 22 faces the bottom pate 15 of the receptacle 13. When driven into the receptacle 13, the rod terminals 22 fasten the electrode 2 between themselves and the bottom plate 15 of the receptacle while being brought into electrical connection with the electrode 2.

In operation, after the gear 1 and the electrode 2 have been fixed in place as described above, an electrolyte is fed under pressure into the device 10 through the port 17. Then, the electrolyte is routed to the clearance 3 between the gear 1 and the electrode 2 through the interior of the post 12 and the opening 16 of the receptacle 13. In this condition, the cathode of a DC power source is connected to the rod terminal 21 which fixes the gear, while the anode of the power source is connected to the rod terminals 22 which fix the electrode 2. This causes the electrolyte, which is jetting upward from the opening 16, to finish the cut surface 1a of the gear based on the principle as described with reference to FIG. 1. The electrolyte flowing out from the clearance 3 and entraining the material produced by electrolysis is discharged to the outside through the port 18.

As described above, the gear 1 and the electrode 2 are fixed and connected to a power source by a single step, i.e., driving the rod terminals 21 and 22. Such promotes the ease of mounting and replacing the gear 1 and electrode 2 and, yet, simplifies the construction of the device 10 to a significant extent.

Figure 3:
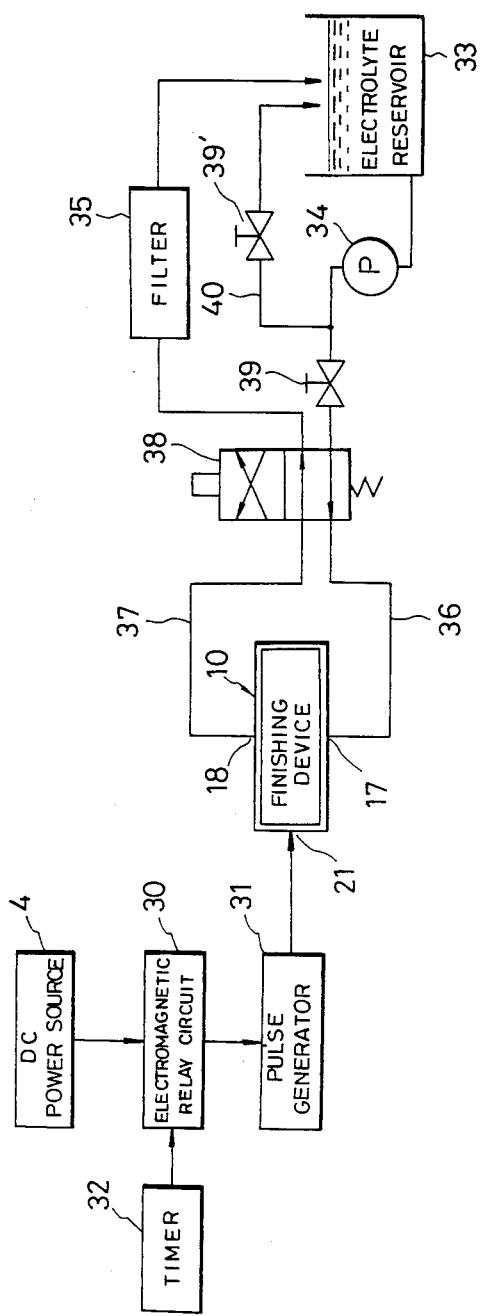
FIG. 3 is a schematic diagram showing an electric and a fluid circuit which are connected to the device of FIG. 2.

Referring to FIG. 3, there are shown an electric circuit and a fluid circuit which are connected to the device 10. As shown, the anode of the DC power source 4 is connected to the anode rod terminal 21 (FIG. 2) via an electromagnetic relay circuit 30 and a pulse generator 31. A timer 32 is connected to the relay circuit 30 so as to turn on and off the latter intermittently. The cathode rod terminals 22 are connected to ground together with the cathode of the power source 4.

In the above electric circuitry, current flows from the gear 1 to the electrode 2 as a train of pulses so that good electrolysis may be effected even when the flow rate of the electrolyte through the clearance 3 is low. Further, the current is supplied intermittently based on a period of time which is set on the timer 32, whereby the products of electrolysis are surely forced out of the clearance 3. While the circuitry of FIG. 3 is provided with both of the relay circuit 30 and the pulse generator 31, it generally suffices to provide either one of them.

Meanwhile, the electrolyte is fed under pressure from a reservoir 33 to the device 10 by a pump 34 and returned from the device 10 to the reservoir 33 by way of a filter 35. Conduits 36 and 37 are connected, respectively, to the ports 17 and 18 (FIG. 2) of the device 10 in order to supply and drain the electrolyte. The conduits 36 and 37 are individually selectively connectable to the pump 34 and filter 35 through a directional control valve 38.

In the fluid circuit as described above, an electrolyte is usually introduced into the device 10 through the lower port 17 to flow upward through the clearance 3 between the gear 1 and the electrode 2. However, when the position of the valve 38 is switched, the direction of flow of the electrolyte is reversed.

Specifically, should the valve 38 be so positioned as to direct the electrolyte upward only through the clearance 3, the finishing accuracy would be somewhat lower at an upper portion of the cut surface 1a, where the products of electrolysis are apt to be gathered, that at a lower part of the same. In the fluid circuit of FIG. 3, the direction of flow of the electrolyte through the clearance 3 is changed over by the valve 38 so that the cut surface 1a may be finished evenly.

The electrolyte which contains the electrolytically produced material is passed through the filter 35 to remove the material and, then, returned to the reservoir 33. In this manner, the electrolyte is circulated through the reservoir 33 and device 10. Further, a return conduit 40 is connected to the delivery side of the pump 34 and opened and closed by valves 39 and 39'. The return conduit 40 is used to interrupt the supply of electrolyte to the device 10 in the event of replacement of the gear 1 and electrode 2 and other necessary occasions.

As regards the electrolyte, it is advantageous to use an aqueous solution of sodium nitrate because it hardly affects the shape of a work. However, a problem with an aqueous solution of sodium nitrate is that a non-conductive film is apt to be developed on the cut surface 1a. Therefore, in those applications which need a substantial period of time to complete the finishing operation, it is preferable to use a solution of salt which would break a non-conductive film possibly formed on the worked surface 1a.

Figure 4A:
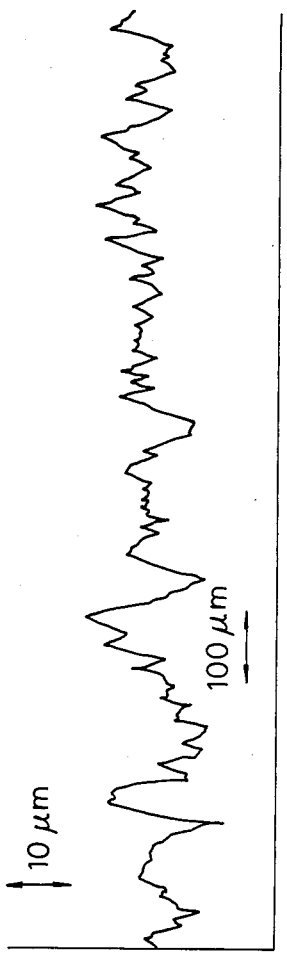
FIGS. 4A and 4B are graphs representative of experimental results for evaluating the method of the present invention, the curve of FIG. 4A showing the roughness of the surface of a work cut by a wire cut discharge process and FIG. 4B, that of the same surface finished by the method of the present invention.
Figure 4B:
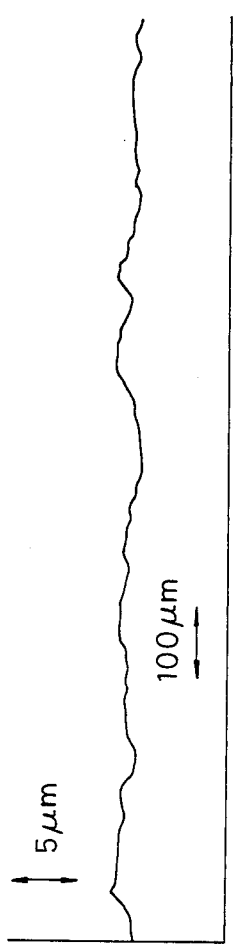
Figure 5:
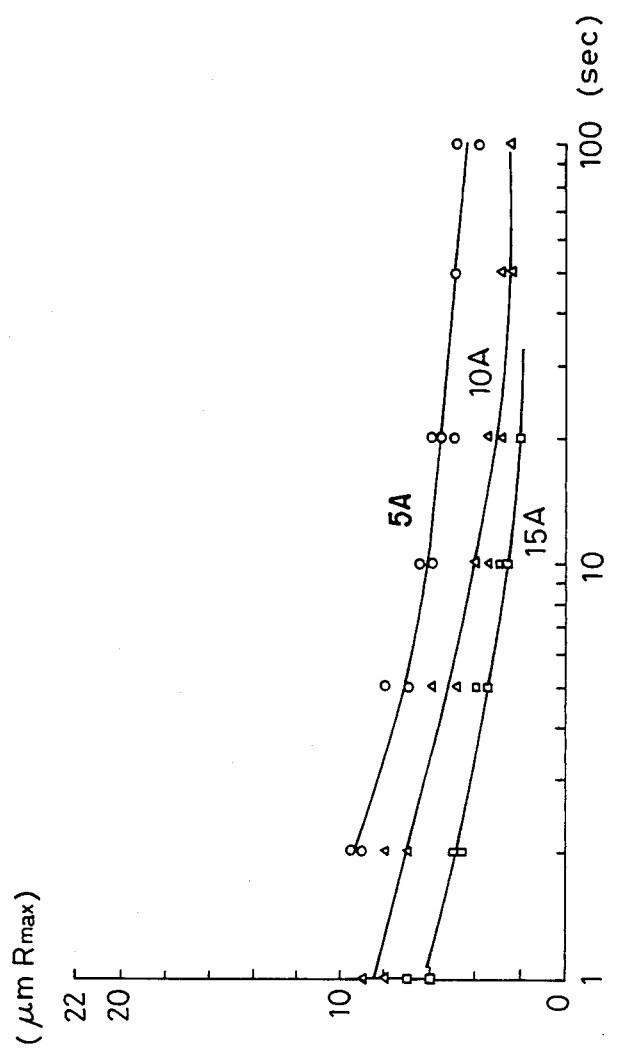
FIG. 5 is a graph showing a relationship between finishing time and surface roughness in accordance with the method of the present invention.

Referring to FIGS. 4A, 4B and 5, there are shown curves representative of the results of experiments which were performed to evaluate the method of the present invention. For the experiments, use was made of a sample which was made of an SKS3 material and dimensioned 5 millimeters by 10 millimeters. When such a sample was cut by a discharge process using a wire whose diameter was 0.25 millimeter, the roughness of the cut surface was measured to range form 20 to 22 $\mu m$ Rmax, as shown in FIG. 4A. The resultant two samples were fixed in place at a distance of 0.3 millimeter from each other, which was the sum of the wire diameter and a discharging gap. A 20% aqueous solution of sodium nitrate was caused to flow upward from below the samples at a flow rate of 100 m$\iota$/min.

Under the condition described above, DC currents of 5A, 10A and 15A are sequentially applied between the two samples to see how the surface roughness thereof was varied. The results of measurement are shown in FIG. 5. It will be seen from the curves of FIG. 5 that the surface roughness becomes lower than 10 $\mu m$ Rmax which is less than one half the originally measured one within only two seconds. FIG. 4B shows a curve representative of the roughness of the finished surface and, when compared with FIG. 4A, proves that the finished surface is significantly smooth. Indeed, the finished surface was observed by eye to be a glossy surface.

In summary, it will be seen that the present invention allows a cut surface of a metal work, which was cut by a wire cut discharge process, to be finished within a very short period of time and, yet, by easy manipulation. The surface finished in accordance with the present invention achieves a significant degree of smoothness.

While the embodiment of the present invention has been shown and described in relation to a particular situation wherein a central part of a metal blank constitutes a work and the waste of the metal blank an electrode, the same method and device in accordance with the present invention is applicable even to the opposite situation wherein a peripheral part of a metal blank constitutes a work and the waste at the center of the blank an electrode; all that is required is reversing the polarities of the DC power source 4.

Various modifications will become possible for those skilled in the art after receiving the teachings of the present disclosure without departing from the scope of the present invention.

We claim:

1. A method of finishing a cut surface of a workpiece which is cut from a metal blank by a wire cut discharge process, comprising:
   locating said workpiece and a remaining portion of said metal blank at substantially a uniform distance from each other;
   feeding an electrolyte between said workpiece and said remaining portion of said blank; and
   causing current to flow intermittently from said workpiece to said remaining portion via said electrolyte.

2. A method as claimed in claim 1, wherein said current is in a form of a train of pulses.

3. A method as claimed in claim 1, wherein said electrolyte comprises a solution of sodium nitrate.

4. A method as claimed in claim 1, wherein said electrolyte comprises a solution of salt.

5. A method as claimed in claim 1, wherein said electrolyte is caused to flow in opposite directions alternatively.

6. A method as claimed in claim 1, wherein said workpiece comprises a gear and is placed in a hole of said remaining portion which is produced by cutting said workpiece.

7. A device for finishing a cut surface of a workpiece which is cut from a metal blank by a wire cut discharge process, comprising:
- a housing defining a passageway for an electrolyte to be fed under pressure;
- fixing members for fixing said workpiece and a remaining portion of said metal blank such that said cut surface of said workpiece and a cut surface of said remaining portion face each other with a clearance left therebetween being positioned in said passageway;
- said fixing members constituting terminals for electrically connecting said workpiece and said remaining portion to a DC power source; and
- wherein said passageway is provided with a directional control valve which changes a direction of flow of said electrolyte.

8. A device as claimed in claim 7, wherein said terminals constituted by said fixing members are connected to said DC power source via a pulse generator.

* * * * *